United States Patent [19]

Welch et al.

[11] Patent Number: 4,601,247

[45] Date of Patent: Jul. 22, 1986

[54] RESILIENT FASTENER CLIP AND JOINT THEREFOR

[75] Inventors: Montgomery J. Welch, Spring Lake; Terry Mitchell, Jenison; David H. Hodge, Hopkins, all of Mich.

[73] Assignee: Modular Systems, Inc., Fruitport, Mich.

[21] Appl. No.: 641,067

[22] Filed: Aug. 15, 1984

[51] Int. Cl.$^4$ ............................................. A47B 5/00
[52] U.S. Cl. ................................. 108/152; 24/458; 24/573; 108/108; 108/109; 411/524
[58] Field of Search ................ 108/108, 109, 152; 411/524; 24/458, 473; 52/811

[56] References Cited

U.S. PATENT DOCUMENTS

| | | | |
|---|---|---|---|
| 1,642,278 | 9/1927 | Vanderlipp | 24/574 |
| 1,914,823 | 6/1933 | Collins et al. | 248/250 |
| 1,938,217 | 12/1933 | Darbyshire | 211/153 |
| 2,020,890 | 11/1935 | Hollander | 248/250 |
| 2,803,352 | 8/1957 | Smola et al. | 211/147 |
| 2,822,198 | 2/1958 | Priestman | 24/458 |
| 2,848,765 | 8/1958 | Showalter | 108/152 |
| 3,259,006 | 7/1966 | Dukatz et al. | 411/524 |
| 3,292,479 | 12/1966 | Tinnerman et al. | 24/573 |
| 3,373,539 | 3/1968 | Meyer | 52/718 |
| 3,491,820 | 1/1970 | Ostling | 52/811 |
| 3,624,703 | 11/1971 | Pavek | 62/298 |
| 3,791,096 | 2/1974 | Epperlein | 52/758 |
| 3,888,525 | 6/1975 | Kousens | 292/87 |
| 4,168,858 | 9/1979 | Inamoto | 296/84 |
| 4,181,382 | 1/1980 | Harvey | 108/152 |
| 4,201,139 | 5/1980 | Suttles | 108/109 |
| 4,440,535 | 4/1984 | Oehlke | 411/524 |

FOREIGN PATENT DOCUMENTS

| | | |
|---|---|---|
| 1287285 | 1/1969 | Fed. Rep. of Germany . |
| 2748823 | 5/1979 | Fed. Rep. of Germany . |
| 1130663 | 2/1957 | France . |
| 100541 | 9/1962 | Norway . |
| 879341 | 10/1961 | United Kingdom . |

Primary Examiner—James T. McCall
Attorney, Agent, or Firm—Price, Heneveld, Huizenga & Cooper

[57] ABSTRACT

A one-piece, resilient fastener clip especially useful for securing furniture shelving, and particularly metal shelving, to side supports via headed studs extending from the supports. The clip is preferably formed from spring steel and includes a pair of resiliently interconnected flanges for securing the clip to a downwardly extending end flange on the shelf. The flanges preferably include slots for slidably receiving a stud, inclined ramp means to draw the shelf toward the support, and a tab for holding the clip on the shelf. The clip allows the shelf to rest on the stud and includes releasable locking means in the form of a third flange resiliently interconnected with one of the other flanges and having a locking aperture therein which is receivable over the stud head. The clip pulls the shelf toward its support with a maximum force when the locking aperture is received over the stud head.

40 Claims, 12 Drawing Figures

RESILIENT FASTENER CLIP AND JOINT THEREFOR

BACKGROUND OF THE INVENTION

This invention relates to furniture shelving and fasteners for supporting and securing such shelving on adjacent supports. More particularly, this invention concerns a resilient, one-piece fastener clip and joint including same which releasably secures the shelf to its support without requiring the tightening or loosening of any threaded or other fasteners.

It has long been conventional in the furniture industry to secure shelving, and particularly hollow or formed metal metal shelving to side supports using threaded screws extending through the shelf end flange into a vertical end panel or support. The installation of such shelves requires the proper tightening of the screws into the end support. However, rapid or somewhat careless installation of the shelving has often resulted in improperly tightened screws which do not adequately secure the shelves to the supports. In addition, even if the screw fasteners were properly tightened initially, the necessity of removing the shelves from time to time has required repeated tightening or loosening of the screws. This often caused stripping of the screws or the bores in which the screws were seated in the end supports, especially when the end supports were formed of soft material such as wood. Further, mere use of the shelving over long periods of time can also cause loosening of the screw fasteners holding the shelves in place.

All of these securing problems created potentially injurious situations since a fully loaded shelf could unexpectedly fall or be knocked loose without warning. In view of such problems standards were proposed in the office furniture industry by the Business Interiors Furniture Manufacturers Association (BIFMA) to reduce the liability potential for injury from improperly secured shelving. Such standards, entitled "Panel Mounted Component Dislodgement Test", now specify an appropriate test procedure to assure that accidental dislodging of a shelf will not occur. Such procedure includes resistance to specified amounts of upward force without structural breakage or loss of serviceability.

Attempts were made to resolve the above problems in various ways. For wood end supports, metal inserts were placed in the end panels to provide proper attachment for the threaded fasteners. This method was expensive due to the labor and materials for installing the inserts and still did not resolve the problem of improper initial tightening or installation of the shelving. The inserts themselves could also loosen and/or come out unexpectedly.

The present invention was devised to meet the above furniture industry standards and in recognition of and as a solution for the above and other related problems.

SUMMARY OF THE INVENTION

The present invention provides a simple, reliable, one-piece, resilient fastener clip which is easily installed on a shelf or other member to be secured to a support without the necessity for tightening screws, preparing welds or other attachment means. The clip is designed to engage a static, headed stud and is easily slipped over the stud and secured in place with little effort. Once in place, the fastener clip prevents removal of the shelf from the support and stud unless a concealed locking flange is purposely flexed to allow removal.

In a preferred form of the invention, a fastener clip is provided for securing one member to a single surface of a support, the support having a headed securing stud extending from that surface. The clip includes first and second flange means for securing the first member therebetween. The flange means are resiliently interconnected with one another and include slot means for receiving the headed stud, first surface means for engaging the surface of the support in which the stud is mounted, and second surface means for engaging the head of the stud and urging the first member toward the surface of the support in which the stud is mounted. Also included are locking means interconnected with the flange means and cooperating with the stud for holding the clip on the stud.

In other aspects of the invention, the locking means are preferably formed as a third flange resiliently interconnected with one of the other flanges and including an aperture adapted to be received over the head of the stud to lock the clip on the stud when the stud reaches a predetermined position or area within the slots of the other flanges of the clip. At such position, the clip exerts maximum drawing force against the stud to pull the shelf or other member and its support properly together, all while allowing the shelf or other member to rest principally on the stud and not the clip.

In other aspects of the invention, a tab is included for retaining the clip on the shelf or other member through engagement with a slot or recess in the shelf. An indentation extending across one of the flanges is also provided to urge the shelf engaging flanges toward one another.

In yet other aspects of the invention, a joint, especially a furniture joint, is provided including the present fastener clip engaged with a shelf or other member, a support, and a headed stud extending outwardly from that support.

Accordingly, the present invention provides a fastener clip which may be slipped on and properly secured in place without any additional installation operations. The invention eliminates the need for the tightening of screws, the provision of welds or other processes. The fastener clip does not require that tight tolerances be met for either itself or the shelf, support or headed stud to which it is secured. The clip is easily removed along with the shelf it secures when removal is desired, all without damage to the clip or shelf or support member. Repeated assembly and disassembly without repair or alteration is, therefore, an important benefit of the present invention. The invention requires minimal changes to shelving to allow use of the fastener clip, requires minimal costs to manufacture or use the fastener, and requires minimal installation time and expense on the shelf and for securing the shelf to its support.

Additional advantages of the invention include the fact that the fastener clip meets or exceeds the above-mentioned BIFMA standards for panel component dislodgement resistance. The clip stays in place after mounting on and during transportation of shelving, works very well with various thicknesses of sheet material used to form shelving, and is concealed and hidden from view after installation on shelving in the preferred manner. Moreover, the preferred form of the invention allows stamping and bending of the fastener clip from a single blank or strip of spring steel through a series of operations to obtain the desired angular relationship between the flanges of the clip.

Also, while operating to draw the shelving to its support in a tight and reliable manner, and operating to retain the shelf on its support unless purposely released, the clip allows the shelf to rest and be supported directly on a portion of the stud thereby preventing the necessity for excessive weight, material or expense in the clip.

These and other objects, advantages, purposes and features of the invention will become more apparent from a study of the following description taken in conjunction with the drawings.

DESCRIPTION OF THE PREFERRED EMBODIMENT

Figure 1:
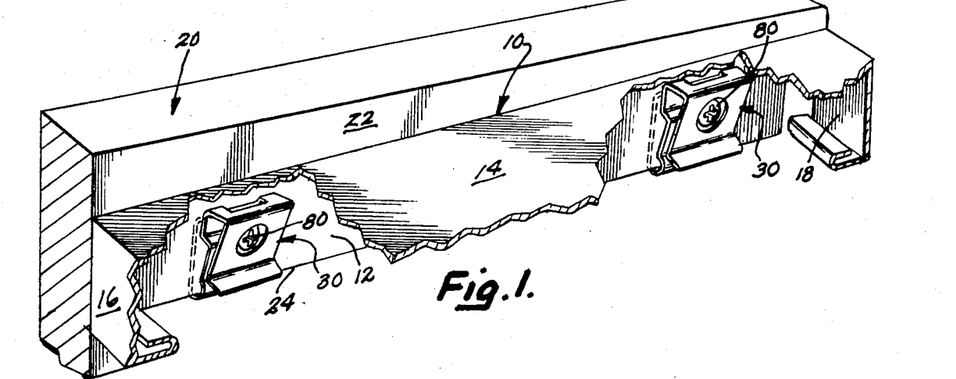
FIG. 1 is a fragmentary, broken, perspective view of a pair of the fastener clips of the present invention secured on the inside of a conventional metal shelf end flange and mounted on a pair of securing studs extending from a conventional end support for shelving.

Referring now to the drawings in greater detail, FIG. 1 illustrates a pair of the one-piece, resilient fastener clips 30 of the present invention secured in the preferred manner to the downwardly extending end flange 12 of a conventional, formed metal furniture shelf 10. Shelf 10 is of the type typically used in currently available office furniture. Metal shelf 10 includes a top or supporting surface 14, formed side flanges 16, 18, and has an overall, hollow form without any bottom surface. When secured in its preferred position, the hollow shelf opens downwardly.

Figures 5, 7, 8, 9, 10, 11:
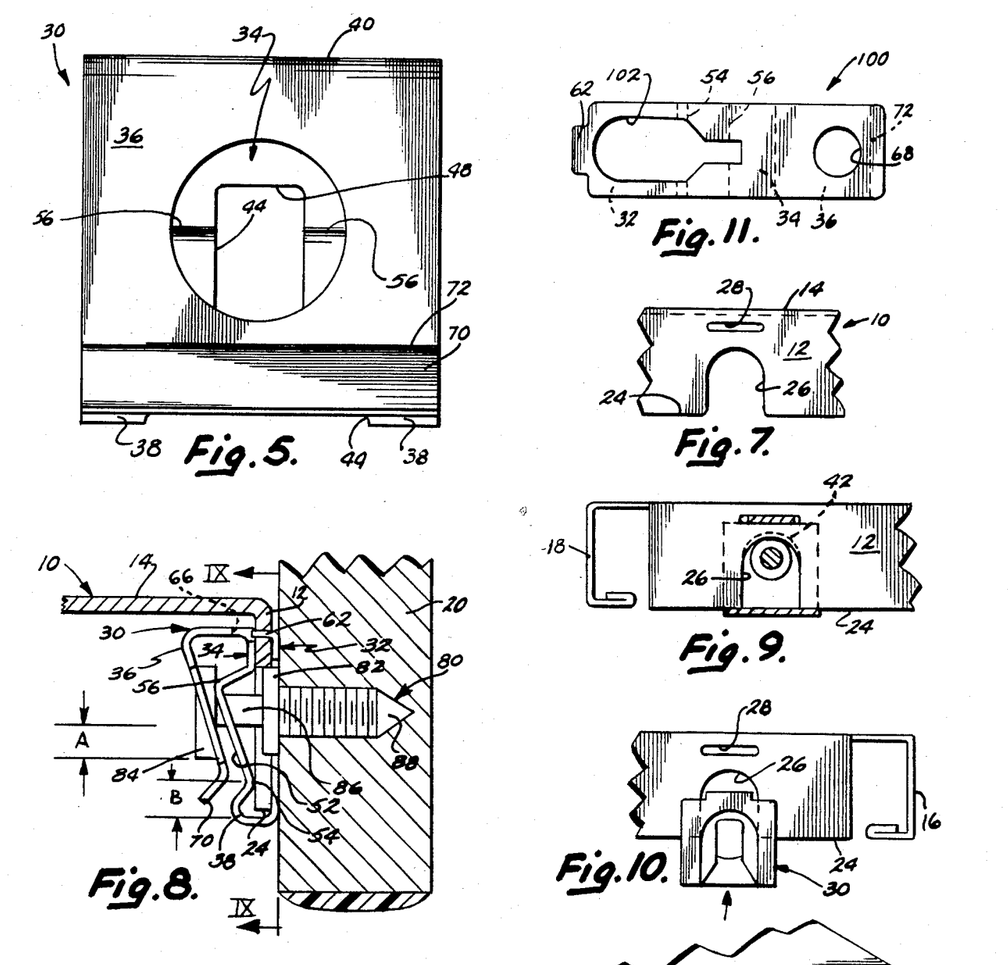
FIG. 5 is a rear elevation of the fastener clip of FIGS. 2-4.
FIG. 7 is a fragmentary, front elevation of an end flange of a conventional metal shelf adapted to receive the fastener clip of the present invention.
FIG. 8 is a side view of the joint of the present invention including the fastener clip mounted on and securing a metal shelf to an end support via a shoulder screw, the metal shelf and end support being shown in section.
FIG. 9 is a sectional view of a portion of the joint taken along plane IX—IX of FIG. 8.
FIG. 10 is a fragmentary, front elevation of a fastener clip of the present invention during installation on a metal shelf end flange.
FIG. 11 is a plan view of a stamped blank or strip of spring steel prior to bending and from which the fastener clip of the present invention is preferably formed.
Figure 12:
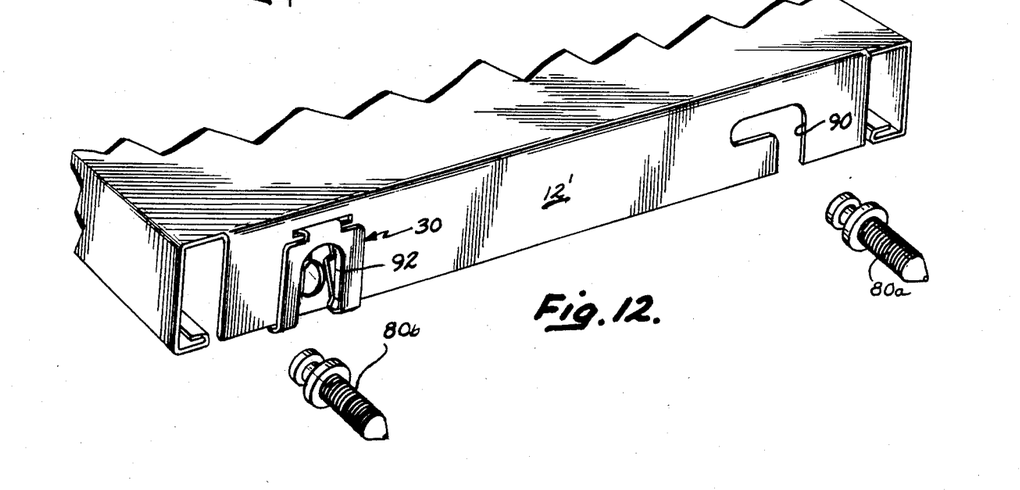
FIG. 12 is a perspective view of an end of a metal shelf incorporating a single fastener clip of the present invention in its securing system.

Typically, metal shelves of the type illustrated in FIG. 1 are supported on cantilever style or other end supports such as that shown at 20 in FIG. 1. Such supports include a side surface 22 which faces inwardly toward the shelf. Typically, a pair of supports 20, one on either end of shelf 10, are used to properly secure the shelf. Fastener clip 30 of the present invention is designed for engagement with a headed stud, preferably a headed shoulder screw 80 (FIGS. 1, 8 and 12). Shoulder screw 80 is threaded or otherwise secured in side support surface 22 and projects perpendicularly outwardly therefrom as is best seen in FIG. 8. Clip 30 is secured over the free, bottom end edge 24 of shelf end flange 12 and is slid downwardly over the inwardly extending headed stud 80 for securement in a manner which will be more fully described hereinafter.

Referring now to FIGS. 2-6, the preferred form of the one-piece, resilient fastener clip 30 includes three interconnected flanges preferably formed in a reverse bend configuration including front flange 32, middle or intermediate flange 34, and rear flange 36. Front and middle flanges 32, 34 are resiliently interconnected by a laterally extending, resilient, flexible, curved wall 38 extending across the full width of the clip and joining the lower or bottom end edge of front flange 32 with the lower or bottom end edge of middle flange 34. Likewise, middle flange 34 is joined to rear flange 36 by a resilient connecting wall but at the opposite end of the clip from curved wall 38 providing the overall clip with its "reverse bend" configuration. Connecting wall 40 extends laterally and transversely across the full width of the clip between the upper or top end edge of middle flange 34 and the upper or top end edge of rear flange 36. When bent and configured in this manner, clip 30 includes a free upper end edge on flange 32 and a free lower end edge on flange 36. Connecting walls 38, 40 allow the full extent of the interconnected flanges to be flexed with respect to one another to allow insertion of the clip on shelf end flange 12 or the lifting of rear flange 36 to allow sliding attachment to headed stud 80 and receipt of the flange over the stud head as will be more fully explained hereinafter.

Figure 2:
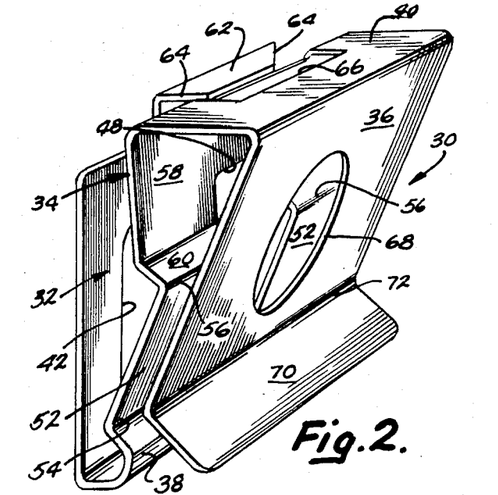
FIG. 2 is an enlarged, perspective view of the fastener clip of the present invention.
Figure 4:
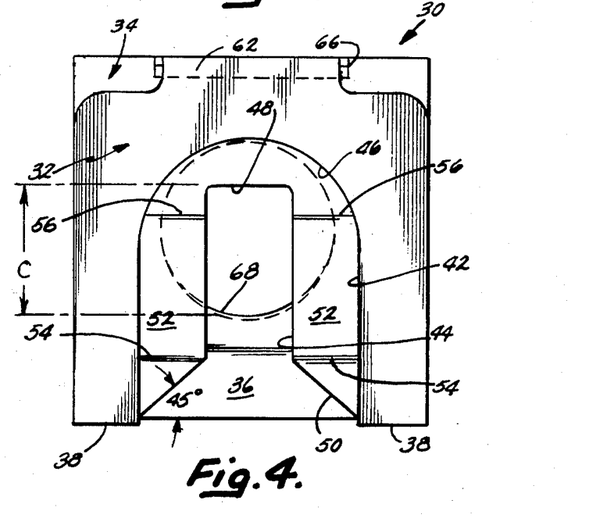
FIG. 4 is a front elevation of the fastener clip of FIGS. 2 and 3.

As is best seen in FIGS. 2, 4 and 5, front and middle flanges 32, 34 include a pair of cooperating, aligned slots 42, 44. Each of the slots 42, 44 is open ended and opens downwardly through curved connecting wall 38. Each of the opposite ends of each slot is closed with slot 42 having a contoured, rounded, closed end 46 while slot 44 has a squared-off closed end 48. Slot 42 has a width which is wider than the diameter of the shoulder 82 (FIG. 8) of the shoulder screw to provide unique support advantages for the fastener clip when assembled with a shelf as described below. Slot 44 is substantially narrower than slot 42 and receives the shaft 86 (FIG. 8) of shoulder screw 80 which extends between its shoulder 82 and its head 84. Slot 44 is also flared outwardly at its open end 50 to properly receive and guide the shaft of the shoulder screw into the narrower part of the slot and upwardly toward closed end 48 as described below. Slots 42 and 44 are also generally perpendicular to wall 38 and aligned with one another along the common center line of clip 30. Slot 42 has a greater length than slot 44 such that its closed end 46 extends farther upwardly in flange 32 than does closed end 48 in flange 34.

Figure 3:
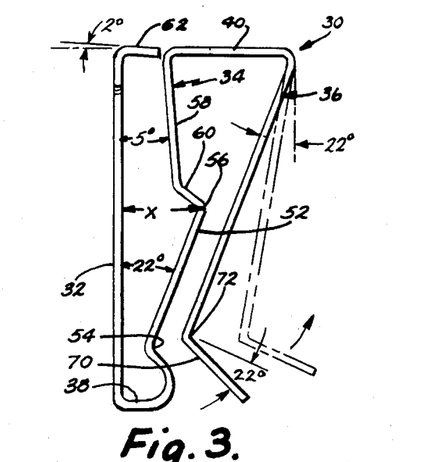
FIG. 3 is a side elevation of the fastener clip of FIG. 2.

While front flange 32 is substantially planar as is best seen in FIG. 3, middle flange 34 is also generally planar although it includes various surface areas extending at angles to one another and to its general plane for functional purposes. Thus, middle flange 34 includes a pair of parallel, inclined, ramp surfaces 52 extending along and on either side of slot 44 from a rectilinear indentation line 54 extending transversely across a bottom portion of flange 34 at the position where the flared outer end 50 of slot 44 joins the main portion of the slot to a rectilinear apex line 56 which is generally centered in flange 34. Apex line 56 marks the greatest distance of inclined ramp surfaces 52 from front flange 32 as shown by distance X in FIG. 3. Extending in an opposite direction from the upper end edge of flange 34 is a second inclined surface area 58. A third surface area defining a short connecting wall 60 extends between the end of inclined surface 58 and apex line 56. As described below, inclined ramp surfaces 52 are adapted to engage the underside of head 84 of securing stud 80 such that, as stud 80 is slid or moved upwardly in slots 42, 44, the clip, and thus the shelf to which it is secured between flanges 32, 34 will be pulled or drawn toward the support for the shelf in which the stud is mounted. Maximum pulling or drawing force is exerted when the stud head engages the apex line 56, at the greatest distance from flange 32, i.e., when shaft 86 of stud 80 is in area C (FIG. 4) of slots 42, 44 above the lower edge of locking aperture 68 in flange 36. Additional biasing force is obtained due to the inclination of surface area 58 such that both surfaces 58 and inclined ramp surfaces 52 act in unison to urge the joint members together. Apex line 56 is also positioned precisely with respect to the location of locking aperture 68 in rear flange 36 to allow locking of the clip to headed stud 80 only after maximum pulling, coupling or drawing force is generated by the clip within the joint. In the preferred form 30 of the invention, inclined ramp surfaces 52 extend at an angle of 22° to the plane of front flange 32, while inclined surface 58 extends at approximately a 5° angle to flange 32. Also, the preferred clip 30 has an overall width of 0.75 inches and an overall height of 0.719 inches, the maximum inclined ramp apex distance X in FIG. 3 being 0.177 inches.

Figure 6:
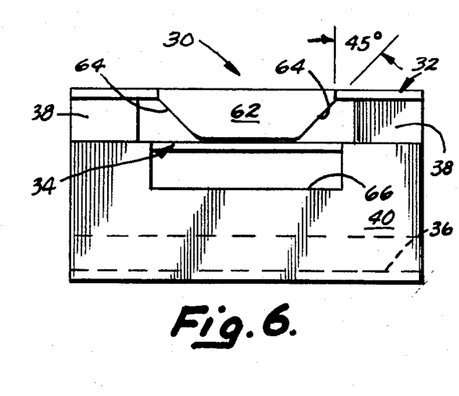
FIG. 6 is a top plan view of the fastener clip of FIGS. 2-5.

As is best seen in FIGS. 2, 3 and 6, front flange 32 includes a generally L-shaped, upstanding, engaging tab or securing flange 62 on its free upper end edge. Flange 62 is adapted to engage a preformed slot or recess 28 in shelf end flange 12 (FIG. 7) to secure the clip on the shelf flange after flange 12 has been inserted between front and middle flanges 32, 34. In order to facilitate insertion of the clip on the shelf end flange, securing tab 62 includes tapered edges 64 preferably formed at a 45° angle as shown in FIG. 6. Also, as will be explained in connection with the method of manufacturing the present fastener clip, a slot 66 for receiving securing tab 62 when flanges 32, 34 are flexed toward one another is provided. Slot or aperture 66 extends a short distance into middle flange 34 and a greater distance into upper connecting wall 40. In addition, securing tab 62 preferably extends at a slight downward angle of 2° (FIG. 3) in order to bias bottom edge 24 of shelf end flange 12 against the bottom of curved connecting wall 38 when the clip is mounted on the shelf.

As shown in FIGS. 2, 4 and 5, rear flange 36 is also generally planar but extends inwardly at an angle to the general plane of middle flange 34. Preferably, flange 36 extends approximately parallel to inclined ramp surfaces 52 (FIG. 3). A circular, locking aperture 68 having a diameter greater than the head 84 of the securing stud 80 is formed generally in the center of flange 36 as shown in FIGS. 2, 4 and 5. Aperture 68 is centered on the common axis of slots 42, 44 which is also the center line of the clip 30. In order to allow flange 36 to be bent outwardly or lifted over the head of securing stud 80 in the end support 20, clip release tab 70 extending outwardly at an angle along bend line 72 at the lower edge of flange 36 is provided. Flange 70 has smooth, rounded lower edges such that, when engaged by the thumb or finger of a person installing or releasing the shelf from the stud, no injury will result.

In order to install fastener clip 30 on a typical, formed metal shelf 10, flanges 32, 34 are flexed apart and the entire clip is inserted over the free bottom end edge 24 of shelf end flange 12 in registry with a slot 26 substantially similar in shape to slot 42 in clip 30 as shown in FIGS. 9 and 10. Slot 26 is slightly shorter in length than slot 42. Clip 30, which has flanges 34 and 36 on the inside surface of shelf end flange 12 when installed, is pushed upwardly until securing tab 62 engages the closed end of slot 26 in shelf end flange 12. Ease in pushing the clip to this point is facilitated by providing a space between flange 32 and the top of flange 34, across which tab 62 extends, which is greater than the thickness or gauge of the sheet metal of the shelf end panel. In the preferred embodiment of the present clip, this distance is 0.090 inches while the gauge or thickness of the preferred shelf metal for use with the clip is 0.062 inches. Although the clip meets resistance at the top of slot 26 in the shelf, slight additional force exerted upwardly on the clip will allow tab 62 to ride up and over the rounded slot end 26 because of the tapered and rounded edges 64 on tab 62 aided by the gap between flanges 32 and 34. When tab 62 reaches the level of securing recess or slot 28, which is spaced slightly above the closed end of slot 26, tab 62 will seat itself in slot 28. The downward angle of the tab 62 will continuously urge and pull the clip upwardly against bottom edge 24.

Apart from tab 62, retention of the clip 30 on shelf end flange 12 is also aided by indentation line 54 mentioned above. By spacing indentation line a distance, shown as B in FIG. 8, above curved connecting wall 38, and providing a proper spacing between flanges 32 and 34, indentation line 54 contacts the inside surface of shelf end flange 12 above the bottom edge 24 of end flange 12 with the resulting torsional forces continuously urging tab 62 into slot 28. This helps retain the clip on the shelf by preventing vibration of the clip thereon during transportation or use.

If removal of the clip from the shelf end flange 12 is desired, it is only necessary to lift front flange 32 away from flange 12 such that tab 62 is disengaged from slot 28 and the entire clip may be slid downwardly off the shelf end flange.

Once the clip 30 is mounted on shelf 10 in the above manner, the shelf and clip together may be mounted on a headed stud, preferably a threaded shoulder screw 80 of the type best seen in FIG. 8, which is secured to a predetermined depth in side support 20. Shoulder screw 80 includes a circular shoulder flange 82 engaged against the vertical inside surface of support 20, a head 84 which is used to drive the screw in place in support 20 and to retain clip and shelf on the support, and a connecting shaft 86 extending between shoulder 82 and head 84. The inner end of screw 80 is threaded for retention in the support. Driving the screw 80 to the depth of shoulder 82 locates head 84 precisely to be in position at the start of inclined ramp surfaces 52.

To engage clip 30 with shoulder screw 80, shelf 12 is positioned with clip 30 directly over shoulder screw 80 and pushed downwardly. As head 84 makes contact with tab 70, rear flange 36 is bent outwardly by such contact. This allows the inside surface of head 84 to engage ramp surfaces 52 with little resistance. Shaft 86 of the shoulder screw is guided into slots 42, 44. As the top of head 84 reaches a point approximately halfway up slot 44, the inside of surface 58 is forced against the inside surface of end flange 12. In such position, tab 62 extends slightly into slot 66 (FIG. 8). With slot 44 now supported above and below the position at which head 84 is contacting ramp surfaces 52, the ramp surfaces adjacent slot 44 offer far more resistance to flexing as shoulder screw head 84 continues upward toward apex line 56 than they would if not so supported. Thus, additional drawing force for the shelf toward the support is provided.

The shoulder screw continues to slide up ramp surfaces 52 until the top edge of collar or shoulder 82 engages the top of closed slot 26 in shelf end flange 12. In this regard, shoulder 82 is approximately twice as thick as the thickness of flange 32 as shown in FIG. 8. At such position, apex line 56 at the end of inclined ramp surfaces 52 engages the underside of head 84. Just prior to contact between shoulder 82 and the top of slot 26 in shelf end flange 12, and after head 84 slides out of contact with tab 70, aperture 68 became aligned with head 84 such that flange 36 snapped downwardly over head 84 to the position shown in FIG. 8. Such engagement essentially locks the clip 30 in place over stud 80 until flange 36 is again bent outwardly such that aperture 68 is lifted over head 84.

Should any attempt be made to lift shelf 10 off stud 80 without so releasing flange 36, shaft 86 will slide only partially down slots 42, 44 until the bottom edge of aperture 68 engages the corner between shaft 86 and head 84 preventing further movement, i.e., the distance A in FIG. 8. Distance A is equal to the difference in radius between shaft 86 and head 84. However, head 84 is sufficiently large such that at all times during movement along distance A, apex line 56 still contacts the underside of head 84 to continue maximum drawing force between the parts of the joint and to prevent loosening of the joint even if such movement without release is attempted. This retention operation enables clip 30 to meet and exceed the BIFMA panel component, dislodgement force standards mentioned above. Even if the clip and shelf are moved through distance A, resistance to bending of flange 34 away from shelf end flange 12 remains maximized because head 84 holds apex line 56, and thus entire flange 34 at a constant distance from shelf end flange 12 during and after such movement.

If, however, release of the clip and shelf from stud 80 is desired, one merely need engage a thumb or finger under tab 70 and push it outwardly from the position shown in FIG. 8 while lifting upwardly on the underside of shelf top 14 such that the entire shelf and clip combination slides easily off the stud.

As will also be understood from FIG. 8, forming slot 44 in flange 32 wider than shoulder 82 and providing flange 32 with a thickness less than shoulder 82 eliminates to the maximum extent any gap between shelf end flange 12 and the side surface of support 20 when mounted in the joint of this invention. If the slot 44 was narrower than the shoulder 82, the clip 30 would ride on the outer face of shoulder 82 instead of against the side surface of support 20 as shown in FIG. 8. Since the clip 30 is preferably formed from sheet spring steel having a thickness of approximately 0.018 inches, the gap between the shelf and its support is minimal which aids the aesthetic appearance of the supported shelf. In addition, it will be understood that the bulk of clip 30 is concealed from view when mounted as shown in FIG. 8. However, release tab 70 is easily accessible by placing one's thumb under the edge of the support 20 or under shelf 10 and up against tab 70 for easy release of the shelf from the inwardly extending stud.

As shown in FIG. 12, it is not necessary that two of the fastener clips 30 be included on each shelf end to properly and securely mount a shelf on a support. Although use of two clips on each end is possible and acceptable as shown in FIG. 1, the securing system of FIG. 12 is a fully satisfactory alternative. In such system, an L-shaped slot 90 is provided adjacent one end of shelf end flange 12' while a generally vertical slot 90, like slot 26 of FIG. 7, for receiving clip 30 is provided adjacent the other end. In this case, a stud or shoulder screw 80a from a support is passed into the vertical leg of slot 90 and thence along the horizontal leg of that slot such that the shelf is slid rearwardly on stud 80a. Stud 80b is mounted in alignment with the vertical slot 92 at the position when stud 80a reaches the closed end of the horizontal leg of slot 90. Thereafter, shelf 12' need merely be dropped downwardly over stud 80b and secured in clip 30 in the above manner to properly hold the shelf in place. Thus, only one clip 30 on either end of the shelf is required.

Manufacture of the fastener clip 30 of the present invention is preferably made from a blank or strip 100 of spring steel as shown in FIG. 11. Blank 100 includes stamped or punched circular aperture 68 and elongated aperture 102 as well as extending tab 62. The blank is bent in the reverse bend configuration to include flange areas 32, 34 and 36 as well as indentation line 54, apex line 56 and clip release tab line 72 all as shown in FIG. 11. During manufacture, slot 66 in flange 34 and wall 40 allows securing tab 62 to pass therethrough. This facilitates forming the 22 angle between inclined ramp surfaces 52 and flange 32 in one pass through the forming die since, when using spring steel stock, it is necessary to bend past the desired angle to obtain the desired angle in the free state. In addition, by creating large open areas between apex line 56 and flange 32 as well as in the triangular area best seen in FIG. 3 between flange 34, wall 40 and flange 36, the various flanges of the clip may be bent from blank 100 around larger posts in the forming die. The inclusion of larger posts in such dies substantially increases the length of the forming die tool life.

Fastening clip 30 may be formed from various thicknesses or gauges of spring steel or may be manufactured from flexible, resilient, resinous plastic materials through the use of multipart injection molding machines. In addition, it will be understood that fastening clip 30 may be useful in joints other than furniture joints and for securing other members besides furniture shelves to various supports.

Accordingly, while one preferred form of the invention has been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. A fastener clip for securing one member to a single surface of a support, the support having a headed securing stud extending from that one surface, said clip comprising:

first and second flange means for securing a first member therebetween, said flange means being resiliently interconnected with one another and having slot means opening toward the location of said interconnection for slidably receiving a headed stud therealong and through said opening from said interconnection location, first surface means for engaging the surface of a support in which the stud is mounted, and second surface means for engaging the head of the stud and urging the first member toward the surface of the support in which the stud is mounted; and locking means interconnected with said flange means and cooperating with the stud for holding said clip on the stud.

2. A fastener clip for securing one member to a single surface of a support, the support having a headed securing stud extending from that one surface, said clip comprising:

first and second flange means for securing a first member therebetween, said flange means being resiliently interconnected with one another and having slot means for receiving a headed stud, first surface means for engaging the surface of a support in which the stud is mounted, and second surface means for engaging the head of the stud and urging the first member toward the surface of the support in which the stud is mounted, said second surface means including engaging means for urging the member and support together with a maximum force when the stud is in a predetermined area within said slot means; and locking means interconnected with said flange means and cooperating with the stud for holding said clip on the stud.

3. The fastener clip of claim 2 wherein said locking means include means receivable over the stud head for engagement with portions of the stud when the stud reaches said predetermined area of said slot means.

4. The fastener clip of claim 3 wherein said locking means include third flange means for engaging the stud; said third flange means being resiliently interconnected with one of said first and second flange means; said means receivable over the stud head include an aperture in said third flange means.

5. The fastener clip of claim 4 wherein said first surface means are included on said first flange means; said second surface means being included on said second flange means.

6. The fastener clip of claim 5 wherein said second surface means include an inclined ramp extending along a portion of said slot means.

7. The fastener clip of claim 6 wherein said first and second flange means are resiliently interconnected at one end of said clip; said slot means extending from an opening at said one end of said clip to a position near the opposite end of said clip.

8. The fastener clip of claim 7 wherein said second flange means includes indentation means spaced from said curved wall means for urging said first and second flange means toward one another when the first member is received between said first and second flange means.

9. The fastener clip of claim 6 including a curved wall means extending across the width of said first and second flange means for resiliently interconnecting said first and second flange means, said wall means including said opening to said slot means and extending generally perpendicularly to said slot means.

10. The fastener clip of claim 6 wherein said third flange means extends generally parallel to said inclined ramp on said second flange means.

11. The fastener clip of claim 10 wherein said third flange means includes a clip release tab for moving said third flange away from said second flange and said aperture away from the stud head.

12. A fastener clip for securing one member to a single surface of a support, the support having a headed securing stud extending from that one surface, said clip comprising:

first and second flange means for securing a first member therebetween, said flange means being resiliently interconnected with one another and having slot means for receiving a headed stud, first surface means for engaging the surface of a support in which the stud is mounted, and second surface means for engaging the head of the stud and urging the first member toward the surface of the support in which the stud is mounted;

said second flange means including indentation means spaced from the position at which said first and second flange means are interconnected for urging said first and second flange means toward one another when the first member is received therebetween; and locking means interconnected with said flange means and cooperating with the stud for holding said clip on the stud.

13. The fastener clip of claim 12 wherein said indentation means include a rectilinear recess extending across the width of said second flange means.

14. A fastener clip for securing one member to a single surface of a support, the support having a headed securing stud extending from that one surface, said clip comprising:

first and second flange means for securing a first member therebetween, said flange means being resiliently interconnected with one another and having slot means for receiving a headed stud, first surface means for engaging the surface of a support in which the stud is mounted, and second surface means for engaging the head of the stud and urging the first member toward the surface of the support in which the stud is mounted;

said first flange means being resiliently interconnected with said second flange means along one edge and including a free end edge opposite said one edge; said first flange means including tab means extending from said free end edge for engaging and holding said clip on the first member when the first member is inserted between said first and second flange means; and locking means interconnected with said flange means and cooperating with the stud for holding said clip on the stud.

15. The fastener clip of claim 14 wherein said second flange means includes an aperture for receiving said tab means when said first flange means is flexed toward said second flange means.

16. A fastener clip for securing one member to a single surface of a support, the support having a headed securing stud extending from that one surface, said clip comprising:

first and second flange means for securing a first member therebetween, said flange means being resiliently interconnected with one another and having slot means for receiving a headed stud, first surface means for engaging the surface of a support in which the stud is mounted, and second surface means for engaging the head of the stud and urging the first member toward the surface of the support in which the stud is mounted;

said slot means including a first open ended slot in said first flange means and a second open ended slot in said second flange means, said first and second slots opening in the same direction and aligned with one another along a common line; and locking means interconnected with said flange means and cooperating with the stud for holding said clip on the stud.

17. The fastener clip of claim 16 wherein said first slot has a first width adapted to receive a shoulder on the headed stud; said second slot having a second width narrower than said first slot width for receiving the shaft of the headed stud.

18. The fastener clip of claim 17 wherein said second slot is flared outwardly at its open end to facilitate sliding insertion of the stud shaft therein.

19. The fastener clip of claim 16 wherein said locking means include third flange means resiliently interconnected with said second flange means for engaging the stud, said third flange means including an aperture which is receivable over the stud head when the stud reaches a predetermined area within said slots; said aperture being aligned with said slots along said common line.

20. A one-piece clip for securing one member to a support having a headed stud extending therefrom, said clip comprising front, middle and rear flanges spaced from one another and resiliently interconnected in a reverse bend configuration with said middle flange having opposite end edges and being joined at one end edge to said front flange and at its other end edge to said rear flange, said front and middle flanges adapted to secure therebetween an end flange from a furniture shelf or the like;

said front and middle flanges each including a slot for receiving the shaft of a headed stud extending from a support, said slots being aligned with one another along a common line;

said rear flange including an aperture adapted for receipt over the stud head to lock the clip on the stud when the shaft of the stud reaches a predetermined area within said aligned slots, said aperture being aligned with said slots on said common line;

said middle flange including inclined surfaces adjacent said slot therein, said inclined surfaces adapted to engage the stud head to draw the shelf toward the support including the stud whereby removal of said clip from the stud is prevented by the engagement of said rear flange aperture with the stud unless said rear flange is lifted over the stud head while the stud is slid along said aligned slots.

21. The fastener clip of claim 20 including engaging means on at least one of said flanges for securing said clip to the furniture shelf end flange or the like.

22. The fastener clip of claim 21 wherein said engaging means include a tab on said front flange extending toward said middle flange.

23. The fastener clip of claim 22 wherein said tab is tapered toward its free end to facilitate insertion of said clip on the shelf end flange; said middle flange including an aperture for receiving the tapered flange when said front and middle flanges are flexed toward one another.

24. The fastener clip of claim 20 wherein said front and middle flanges are generally parallel to one another; said rear flange extending inwardly toward said middle flange and being generally parallel to said inclined surfaces on said middle flange.

25. The fastener clip of claim 20 wherein said inclined surfaces extend away from the front flange to a position of maximum distance from the front flange where the force drawing the shelf and stud support together is a maximum; said rear flange aperture being positioned to be received over the stud head only when the stud head engages the inclined surfaces at said position of maximum distance.

26. The fastener clip of claim 25 wherein said inclined surfaces are positioned to maintain contact between their position of maximum distance and the stud head continuously at all times when said rear flange aperture is locked over the stud head.

27. The fastener clip of claim 20 wherein said front and middle flanges are resiliently interconnected by a curved wall extending along and between the bottom end edges of said front and middle flanges; said slots both being open ended and both opening through said curved wall.

28. The fastener clip of claim 27 wherein said slot in said front flange has a first width adapted to receive a shoulder on the headed stud; said slot in said middle flange having a second width narrower than said first width for receiving the shaft of the headed stud.

29. The fastener clip of claim 28 wherein said middle flange slot is flared outwardly at its open end to facilitate sliding insertion of the stud shaft therein.

30. The fastener clip of claim 27 wherein said middle flange and rear flange are resiliently interconnected by another wall extending along and between the top end edges of said middle and rear flanges.

31. The fastener clip of claim 30 wherein said clip is formed from thin gauge, spring steel.

32. The fastener clip of claim 20 wherein said middle flange includes an indentation extending generally transverse to said slot therein for urging said front and middle flanges toward one another when the furniture shelf end flange or other member is inserted therebetween; said indentation being spaced from said one end edge.

33. The fastener clip of claim 32 wherein said middle flange includes a second inclined surface extending from said other end edge to the first of said inclined surfaces.

34. The fastener clip of claim 20 wherein said rear flange includes a clip release tab for bending said rear flange outwardly and lifting said rear flange aperture over the stud head.

35. A furniture joint for securing a furniture shelf or the like to a support, said support including a support surface and a headed stud extending from said support surface; and shelf including a downwardly extending end flange having a bottom free edge and a mounting slot opening through said bottom free edge, said mounting slot including a closed end opposite said opening;

a fastener clip for removably securing said shelf to said support and stud, said clip being mounted on said shelf end flange in alignment with said mounting slot and including first and second flange means for securing said shelf end flange therebetween, said flange means being resiliently interconnected with one another and having slot means for receiving said headed stud, first surface means for engaging said support surface, and second surface means for engaging the head of said stud and urging said shelf end flange toward said support surface; and locking means interconnected with said flange means and cooperating with said headed stud for holding said clip on said headed stud.

36. The joint of claim 35 wherein said shelf end flange includes a recess adjacent said mounting slot; one of said first and second flange means including a tab for engaging said shelf recess to hold said clip on said shelf end flange.

37. The joint of claim 35 wherein said headed stud includes a shoulder for limiting the depth to which said stud is inserted in said support surface, said shoulder engaging said support surface and spaced from said head by a shaft; said first flange means including said first surface means; said slot means including a slot in said first flange means having a width wider than said stud shoulder for receiving said shoulder therein.

38. The joint of claim 37 wherein said locking means include third flange means for engaging said stud; said third flange means being resiliently interconnected with one of said first and second flange means; said locking means further including an aperture in said third flange means which is larger than said stud head and receivable over said stud head.

39. The joint of claim 37 wherein said stud shoulder is thicker than said first flange means whereby said shoulder projects through said slot in said first flange means and engages said closed end of said mounting slot in said shelf end flange.

40. The joint of claim 35 wherein said shelf end flange includes a second mounting slot spaced from the first said mounting slot and adapted to receive a second headed stud mounted in said support surface; said second mounting slot having a first portion generally parallel to said first mounting slot and a second portion extending toward but generally perpendicular to said first mounting slot; said fastener clip receiving the first of said headed studs when said second headed stud is received in said second portion of said second mounting slot.

* * * * *

UNITED STATES PATENT AND TRADEMARK OFFICE
CERTIFICATE OF CORRECTION

PATENT NO. : 4,601,247

DATED : July 22, 1986

INVENTOR(S) : Montgomery J. Welch, Terry Mitchell and David H. Hodge

It is certified that error appears in the above-identified patent and that said Letters Patent is hereby corrected as shown below:

Column 9, line 60:

"7" should be --9--

Column 12, line 60:

"and" should be --said--

Signed and Sealed this

Third Day of March, 1987

Attest:

DONALD J. QUIGG

Attesting Officer

Commissioner of Patents and Trademarks